Patented Feb. 20, 1951

2,542,848

UNITED STATES PATENT OFFICE 2,542,848

DIAZOTYPES CONTAINING THIOBARBITURIC ACID

William H. von Glahn, Loudonville, and Lester N. Stanley, Delmar, N. Y., assignors to General Aniline & Film Corporation, New York, N. Y., a corporation of Delaware No Drawing. Application October 22, 1948, Serial No. 56,045

5 Claims. (Cl. 95—6)

This invention relates to diazotype photoreproduction media and more particularly to the use of a certain azo component in the development of the diazotype light sensitive layers.

The diazotype process as is well known involves the treating of a carrier or base usually paper, which may be either opaque or transparentized, or film of the cellulose ester or cellulose ether type or fabrics with a sensitized composition containing a diazo compound as the light sensitive element. This treated base is exposed to actinic light, particularly from sources rich in the ultraviolet band of from 3600 Å to 4200 Å., which light is applied to the sensitized surface through a pattern, drawing or picture to be reproduced. A positive reproduction of the original is obtained by development of the undecomposed azo compound under the protected portions of the pattern, drawing or picture by means of alkaline coupling of an azo dye coupling component. The azo dye coupling component used for development of the image may be contained in an alkaline developing solution as is the case in the so called wet developing or one component process. In the dry development or two component diazotype process the sensitizing composition with which the base material is treated contains both the diazo compound and the azo coupling component. Here the azo dye positive image is formed after exposure of the sensitized material by subjecting the exposed material to the action of alkaline vapors, such as ammonia vapors.

The dye components used in diazotype photo sensitized materials must be capable of producing dyes which have good permanency and substantivity for the base material. They must have good wash fastness so that the image will not be blurred by bleeding of the dye into the background. The dyes must also be fast to light and to offset, that is rubbing off of the dye by abrasive means with which the print may be contacted. In addition, diazotype components for use in the two component diazotype process must be stable to pre-coupling and oxidation. If they are not stable to pre-coupling and oxidation, color will be produced on the light sensitive material prior to its use. This spontaneous developing of color will remain in the background of the print after exposure and development, thus diminishing the contrast between the image and the background.

In all positive photoprinting processes, particularly where final copies are being made, it is highly desirable to produce a copy which will have a distinctive color, preferably a dark shade on a clear background. The sensitivity of the diazo compound, and in the case of two component diazotypes, the stability of both the diazo compound and the azo component against precoupling are the principal contributing factors in the provision of the clear background. A number of types of diazo compounds and coupling components have been suggested for use in diazotypes which satisfactorily comply with these requirements. Very few components are known, however, which will also produce the desired distinctive dark shades. Phloroglucinol is widely known as a coupling component which will produce a dark purplish blue shade with the diazo compounds generally employed in diazotypes and it is in some instances used commercially. However, its pre-coupling stability is not good and consequently, residual color is produced in a short time where storage is necessary. The 2,3-dihydroxynaphthalene couplers of U. S. Patent 2,196,950 are generally used for the production of distinctive blue images in diazotypes and, although satisfactory in most respects, also have some tendency to precouple on storage. These couplers are the only ones which have received any degree of commercial acceptance in the production of diazotypes which will reproduce the image in a dark shade, particularly in the blue range. Some others have been suggested, such as pyrazolones and the pyridones of Patent 2,431,190. Other than these latter there are few heterocyclic type couplers utilized or suggested for the production of any diazotype prints.

We have now found that a coupling component, heterocyclic in nature, which previously has not been used or suggested for the production of diazotypes will produce excellent results where it is desired to develop the image in a dark shade. This coupling component is thiobarbituric acid having the formula—

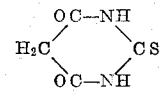

(Beilstein 24 page 476). This coupling component fills all of the rigid requirements for diazotypes satisfactorily. It is very stable against precoupling when used in the two component system and when reacted with the usual diazo compounds used in the diazotypes such as the mono diazo compound of p-phenylene diamines it forms prints of a shade having very good visual intensity in clearly defined images. In most instances, the shade is a deep rich blue against a clear background. The azo dye images obtained from the reaction of the thiobarbituric acid coupler with the diazo compounds are particularly fast to light, washing and offset.

The diazo compound which is utilized with the thiobarbituric acid coupling component may be any one of those generally employed in the diazotype art, such as the diazo compounds of amino-naphthol sulfonic acids or preferably amino diazo compounds of the mono diazotized p-phenylene diamines. As a practical matter mono diazo compounds of this preferred class are substituted at least once on the amino group in para position to the diazo group, but the unsubstituted compounds are included. Diazo compounds may be used as such or in the form of their stabilized double salts or complexes such as the double salts of the zinc chloride, cadmium chloride or tin chloride or the fluoroborate complexes, or as the alkyl or aryl sulfonates such as the methyl, ethyl, propyl and phenyl sulfonates or as the acid sulfates of the diazo compound. The following table lists a number of amines from which light sensitive diazo compounds which we have found to be suitable in combination with the thiobarbituric acid coupler may be obtained. The diazo compounds are produced by the usual process of diazotization and salting out in the form of the diazonium complexes.

Table of amines 2,5-diethoxy-4-(4'-ethoxyphenyl) aniline
p-(N-hydroxyethyl-N-methylamino) aniline
p-(N-hydroxyethyl-N-ethylamino) aniline
p-Aminodiphenylamine
p-Ethylamino-m-toluidine
p-Dimethylamino-o-toluidine
p-Diethylamino-o-phenetidine
p-Dimethylamino-o-phenetidine
4-benzoylamino-2,5-diethoxyaniline
2-amino-5-dimethylaminobenzoic acid
p-Diethylaminoaniline
p-Dimethylaminoaniline
p-(N-benzyl-N-ethylamino) aniline
p-Dihydroxyethylaminoaniline
p-(N-ethyl-N-hydroxyethylamino)-o-toluidine
p-Dihydroxyethylamino-o-chloroaniline
p-Ethylaminoaniline
p-Phenylenediamine The sensitized compositions may contain in addition to the diazo compound and the azo component the usual adjuncts such as metal salts for intensification of the dye image, such as aluminum sulfate, titanium ammonium fluoride, nickel sulfate, zinc chloride and the like, stabilizing agents such as thiourea, naphthalene trisulfonic acid and the like, stabilizing acids for retarding pre-coupling such as citric acid, boric acid and tartaric acid, hygroscopic agents, such as ethylene-glycol, glycerine and dextrine, solvents such as isopropyl alcohol and wetting agents such as saponin. The base material upon which the light sensitive layer is coated may be a sheet, film or web forming material, such as cotton, linen, rayon or other cloth, paper, film of cellulosic derivatives and other materials, such as polyvinyl derivatives and superpolyamides.

While it is preferred that the thiobarbituric acid coupling component be incorporated in the sensitizing compositions in accordance with the two component diazotype method, nevertheless the invention may be also applied according to the one component method wherein the sensitized layer contains the diazo compound and the azo component is applied subsequently in a developing solution to effect the development of the exposed image.

The invention is further illustrated by the following examples, but it is understood that the invention is not restricted thereto, as the examples are for purposes of illustration and are not intended to be limitative.

Example 1

Diazotype paper stock made of 100% rag paper is coated with an aqueous solution containing the following ingredients per 100 cc. of solution:

1.0 gs. thiobarbituric acid
2.2 gs. diethylaminobenzene - p - diazo - $ZnCl_2$ double salt
8.0 gs. citric acid
4.0 gs. thiourea
5.0 gs. $ZnCl_2$ The resulting sensitized paper after exposure under a pattern and development in the usual developing machines with gaseous ammonia yields prints of an excellent lavender blue shade having well defined lines against a pure white background. Prior to exposure and development, the sensitized paper has excellent stability to pre-coupling in storage even under the extreme conditions of an accelerated aging test. After being subjected to the severe temperature and humidity condition of accelerated aging, the prints obtained upon subsequent exposure and development show only very slight residual color in the background. Under this same test most couplers heretofore employed for the production of dark shades in diazotypes quickly develop substantial background color.

Example 2

Diazotype paper stock is coated with an aqueous solution containing the following ingredients per 100 cc. of solution:

1.0 gs. thiobarbituric acid
2.5 gs. N,N - dimethyl - m - toluidine - p - diazo - $ZnCl_2$ double salt
8.0 gs. citric acid
4.0 gs. thiourea
5.0 gs. $ZnCl_2$ The sensitized paper coated with this solution has the same good stability to pre-coupling as that of Example 1. It also produces prints having a well defined lavender blue image against a clear white background.

Example 3

A diazotype paper stock is coated with an aqueous solution containing the following ingredients per 100 cc. of solution:

1.0 gs. thiobarbituric acid
2.3 gs. N - methyl - N - hydroxyethyl aniline - p-diazo-$ZnCl_2$ double salt
8.0 gs. citric acid
4.0 gs. thiourea
5.0 gs. $ZnCl_2$ The procedure for processing the sensitized paper of this example is the same as in Example 1. Its stability properties against pre-coupling are of the same degree as the diazotype material of Example 1. The prints are obtained in a reddish blue shade of well defined lines against a white background.

Example 4

Diazotype paper stock is coated with an aqueous solution containing the following ingredients per 100 cc. of solution:

1.0 gs. thiobarbituric acid
2.5 gs. diphenylamine-p-diazonium acid sulfate
8.0 gs. citric acid
4.0 gs. thiourea
5.0 gs. $ZnCl_2$ The procedure for processing the light sensitized diazotype layer produced by this example is the same as in the case of Example 1. Prior to exposure and development the light sensitive layer exhibits the same degree of stability to precoupling as in the case of the sensitized layer of Example 1. The prints are obtained in a violet color against a clear white background.

*Example 5*

Diazotype paper stock is coated with an aqueous solution containing the following ingredients per 100 cc. of solution:

1.0 gs. thiobarbituric acid
2.4 gs. N,N - dimethyl - m - phenetidine - p - diazo-ZnCl₂ double salt
8.0 gs. citric acid
4.0 gs. thiourea
5.0 gs. ZnCl₂

The thus coated paper has excellent stability to precoupling and prolonged storage. Its stability factor is comparable with the coating produced in accordance with Example 1 under the conditions of accelerated aging. After exposure under a diapositive and development with ammonia fumes a greenish blue print of the original is obtained which has well defined lines against a clear white background.

*Example 6*

Diazotype paper stock is coated with an aqueous solution containing the following ingredients per 100 cc. of solution:

1.0 gs. thiobarbituric acid
2.3 gs. 3-(dimethylamino) benzoic acid-6-diazo-ZnCl₂ double salt
8.0 gs. citric acid
4.0 gs. thiourea
5.0 gs. ZnCl₂

The thus coated paper has excellent stability to precoupling during prolonged storage and its stability factor is of the same order as that of Example 1 under the conditions of accelerated aging. After exposure under a pattern and development of the image with ammonia fumes a violet print against a clear white background is obtained.

*Example 7*

Diazotype paper stock is coated with an aqueous solution containing the following ingredients per 100 cc. of solution:

2.6 gs. 2,5-diethoxy-N-benzoyl aniline-p-diazo-ZnCl₂ double salt
8.0 gs. citric acid
4.0 gs. thiourea
5.0 gs. ZnCl₂

After exposure of this sensitized coating under a pattern the image is developed in a mildly alkaline solution of thiobarbituric acid to a bright red print against a clear white background.

*Example 8*

Diazotype paper stock is coated with an aqueous solution containing the following ingredients per 100 cc. of solution:

2.5 gs. 2,5,4'-triethoxydiphenyl-4-diazonium acid sulfate
8.0 gs. citric acid
4.0 gs. thiourea
5.0 gs. ZnCl₂

After exposure under a pattern the paper is developed in a mildly alkaline solution of thiobarbituric acid to an attractive maroon print against a clear white background.

In the accelerated aging tests used to determine the stability of the diazotype coatings of these examples against precoupling and decomposition of the dye components the sensitized carrier is subjected, after the usual drying, to a temperature of 120° F for 48 hours at a relative humidity of 50%.

We claim:

1. Diazotype light sensitive layers on a suitable base containing a suitable diazo light sensitive compound and the azo coupling component, thiobarbituric acid having the formula:

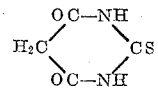

2. Diazotype light sensitive layers on a suitable base containing a mono diazo compound of a p-diamine of the benzene series and the azo coupling component, thiobarbituric acid having the formula:

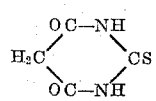

3. Diazotype light sensitive layers on a suitable base containing a diethylaminobenzene-p-diazo and the azo coupling component, thiobarbituric acid having the formula:

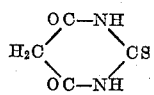

4. Diazotype light sensitive layers on a suitable base containing an N,N-dimethyl-m-toluidine-p-diazo and the coupling component, thiobarbituric acid having the formula:

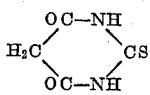

5. Diazotype light sensitive layers on a suitable base containing an N-methyl-N-hydroxyethyl aniline-p-diazo and the azo coupling component, thiobarbituric acid having the formula:

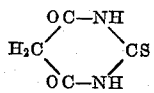

WILLIAM H. von GLAHN.
LESTER N. STANLEY.

REFERENCES CITED

The following references are of record in the file of this patent:

UNITED STATES PATENTS

| Number | Name | Date |
| --- | --- | --- |
| 2,140,539 | McNally et al. | Dec. 20, 1938 |
| 2,283,220 | McNally et al. | May 19, 1942 |

OTHER REFERENCES

Spencer, "Photographic Applications of Diazo Compounds," The Photographic Journal, December, 1928, pp. 490 to 496, pp. 490 and 491 cited.